United States Patent [19]

Harvey

[11] Patent Number: 4,840,292

[45] Date of Patent: * Jun. 20, 1989

[54] METHOD AND APPARATUS FOR DISPENSING OIL WELL PROPPANT ADDITIVE

[76] Inventor: Robert D. Harvey, Rte. 3, Box 177AA, Kilgore, Tex. 75662

[*] Notice: The portion of the term of this patent subsequent to Jul. 21, 2004 has been disclaimed.

[21] Appl. No.: 172,568

[22] Filed: Mar. 24, 1988

[51] Int. Cl.⁴ .............................................. G01F 11/24
[52] U.S. Cl. ........................................ 222/1; 222/410; 222/412; 222/478
[58] Field of Search .............. 222/412, 413, 188, 185, 222/71, 410, 478, 481.5, 488, 489, 14, 643, 642, 638, 333, 411, 481; 141/309; 250/259, 260; 406/56; 137/587, 588; 384/191.2

[56] References Cited

U.S. PATENT DOCUMENTS

| | | | |
|---|---|---|---|
| 532,645 | 1/1895 | Cushing et al. | 222/413 |
| 2,196,323 | 11/1937 | Norton et al. | 222/188 X |
| 2,458,978 | 1/1949 | Chace | 222/71 X |
| 2,525,973 | 11/1950 | Sundstrom et al. | 222/413 |
| 2,724,535 | 11/1955 | Day et al. | 141/309 X |
| 2,833,600 | 5/1958 | Lyons | 384/191.2 |
| 2,947,359 | 8/1960 | Josendal et al. | 250/260 |
| 2,951,535 | 9/1960 | Mihram et al. | 250/260 |
| 2,988,640 | 6/1961 | Steele | 250/260 |
| 3,010,023 | 11/1961 | Egan et al. | 250/260 |
| 3,139,123 | 6/1964 | Lisciani | 141/309 X |
| 3,160,210 | 12/1964 | Brewer | 137/268 |
| 3,305,133 | 2/1967 | Parker | 222/643 |
| 3,658,212 | 4/1972 | Ullberg | 222/413 X |
| 3,749,124 | 7/1973 | Andres | 137/587 |
| 3,949,220 | 4/1976 | Sparlin et al. | 250/260 |
| 3,999,686 | 12/1976 | Kato | 222/71 X |
| 4,072,371 | 2/1978 | Hill et al. | 384/191.2 X |
| 4,199,680 | 4/1980 | Moon | 250/260 |
| 4,265,266 | 5/1981 | Kierbow et al. | 137/101.19 |
| 4,502,820 | 3/1985 | Fujii | 222/413 X |
| 4,681,245 | 7/1987 | Harvey | 222/643 |
| 4,697,618 | 10/1987 | Youtt et al. | 137/587 |
| 4,726,715 | 2/1988 | Steen et al. | 222/413 X |

FOREIGN PATENT DOCUMENTS

91677  9/1961  Denmark ............................. 222/478

*Primary Examiner*—Kevin P. Shaver
*Attorney, Agent, or Firm*—Baker, Mills & Glast

[57] ABSTRACT

An apparatus for dispensing an additive (70) into a stream (14) of well proppant includes a sealed housing (42), (44), (52) containing a first chamber (102), a second chamber (104), and an additive dispenser (64), (72) operably connected to a motor (92). The upper chamber (102) is adapted to contain the additive (70), and the lower chamber (104) communicated with the pressurized well proppant stream (14). The additive dispensing means (64), (72) is disposed between the upper chamber (102) and the lower chamber (104). Pressure equalizing tubes (98 and 99) within said housing (42), (44), (52) extend from the upper chamber (102) through the additive dispenser (64), (72) to the lower chamber (104) to equalize the fluid pressure existing in the lower chamber (104) with the fluid pressure existing in the upper chamber (102) during the dispensing of the additive (70) from the upper chamber (102) to the lower chamber (104). In the preferred embodiment the additive dispenser (64), (72) consists of a screw or auger (72) disposed within an auger ring (64), and the additive (70) flows through the additive dispenser (64), (72) to the lower chamber (104) under the force of gravity. Where the additive (70) consists of radioactive sand used as a tracer for well logging purposes, the apparatus may be provided with an electrical power end control circuit (106) to remotely control the dispensing of radioactive sand (70).

7 Claims, 2 Drawing Sheets

METHOD AND APPARATUS FOR DISPENSING OIL WELL PROPPANT ADDITIVE

TECHNICAL FIELD OF THE INVENTION

This invention relates in general to the field of fracturing earth formations in oil or gas wells, and relates more particularly to an improved method and apparatus for injecting an additive into a proppant for well logging purposes.

BACKGROUND OF THE INVENTION

It is known in the art to inject sand containing a radioactive carrier into fractured earth formations in oil or gas wells to determine the location of such fractures. As an example, reference is made to Mihram, et. al., U.S. Pat. No. 2,951,535. Conventionally, a sand/fluid mixture is injected into a fractured oil well after it has been pressurized by, e.g., a slurry pump. Feeding the slurry pump is a line from a blender, which blends a fluid with sand, commonly termed a proppant. Radioactive sand is conventionally injected by an injection tool in the line between the blender and the slurry pump. The passage of the proppant as mixed with the radioactive additive through the slurry pump causes possible radioactive contamination of the slurry pump and all down-line apparatus, and is thus undesirable. However, conventionally, the injection tool has not been able to be placed on the pressurized side of the slurry pump, as the presence of pressure on the radioactive proppant injecting mechanism causes the sand to clog, especially when there is a change of pressure in the pressurized proppant line. Thus, the location of the injection tool has heretofore been restricted to a low pressure point on the sand proppant slurry line before the pump.

Pressure equalizing conduits are known in the fields of applying dry chemicals to oil wells and more generally for adding a dry material to a liquid. Examples of such tubes can be found in U.S. Pat. Nos. 4,265,266 to Kierbow et al. and 3,160,210 to Brewer.

However, these prior art pressure equalizing tubes are not designed for use in high-pressure applications, as evidenced by the disposition of the equalizing tube in each case in a position exterior to the dry material injector housing. Rather than equalizing two chambers at relatively high pressures, Kierbow discloses the venting of pressure on the forward side of a horizontal screw conveyor to ambient atmospheric pressure. Brewer discloses a tube exteriorally connecting a region of a cylinder behind a piston pressing a dry chemical agent downward into a horizontal screw conveyor to a point situated midway along the screw conveyor. In addition to being of relatively complex construction, this positioning of a pressure equalization tube would still not prevent clogging in the remaining distance of the screw conveyor. Both Kierbow and Brewer also disclose pressure equalization tubes as used in connection with horizontal screw conveyors, rather than a pressure equalization tube used in connection with a dispenser operating using the force of gravity to move the additive.

To meet these inadequacies, a radioactive proppant dispenser which may be connected to the high pressure side of a fracturing system to automatically meter desired amounts of radioactive proppant without clogging was required. Such a device is described in U.S. Pat. No. 4,681,245, July 21, 1987, to Harvey, which is incorporated herein by reference.

Although the device disclosed in the Harvey patent provided improved dispensing operation, there are still some needed improvements. It has been found that air is trapped above the proppant by the inflow of fluid through the pressure equalizing tube. The rapid inflow of fluid also causes agitation of the proppant resulting in an undesirable foam being created. The unwanted foam, agitation and trapped air has allowed the premature release of proppant.

Additionally, the loading of the Harvey device with proppant requires that the cap and all parts connected thereto be removed in order to fill the chamber with proppant. Thus, a need has arisen for a way to prevent premature release of proppant and for a more convenient loading operation for the Harvey '245 device.

SUMMARY OF THE INVENTION

The present invention disclosed and claimed herein described an improved method and apparatus for dispensing oil well proppant additive which substantially eliminates problems associated with prior dispensing devices. The present invention prevents the trapping of air during the inflow of fluid and, therefore, prevents premature release of proppant.

In accordance with one aspect of the invention two pressure equalization tubes are installed between a lower chamber and an upper chamber. The lower chamber releases proppant while the upper chamber stores proppant. Two pressure tubes allow air within the upper chamber to be exhausted through one or both of the tubes during inflow of fluid rather then being trapped within the upper chamber.

In accordance with another aspect of the present invention, a hole is formed through the housing which encloses the proppant. The hole is provided with a removable cap. To fill the housing with proppant, the cover is removed and proppant is injected through the hole.

It is a technical advantage of the present invention to prevent the trapping of air which causes premature release of proppant. It is a further technical advantage of the present invention that proppant may be injected into the storage chamber without removing the cap and its associated parts.

BRIEF DESCRIPTION OF THE DRAWINGS

For a more complete understanding of the present invention and the advantages thereof, reference is now made to the following Detailed Description taken in conjunction with the accompanying Drawings in which.

DETAILED DESCRIPTION OF THE INVENTION

Figure 1:
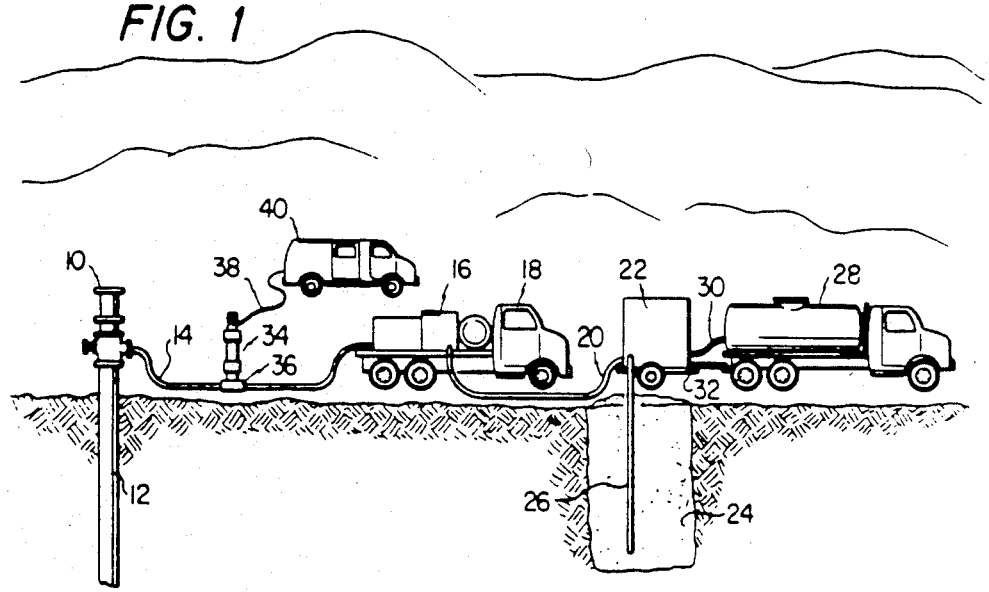
FIG. 1 is a schematic diagram showing employment of the invention in pumping a sand/fluid pressurized stream into a fractured oil well.

Referring now to FIG. 1, a conventional christmas tree 10 is shown associated with a well 12 containing one or more zones (not shown) being subjected to a fracturing process. The location of the fractured zones is to be found by radioactive logging techniques. Being pumped into well 12 via pressurized proppant line 14 is a stream of fluid/sand proppant containing a radioactive marker. The radioactive marker will subsequently be detected to determine the location of the fracturing sand to indicate the success of the fracturing process. Pressurized proppant line 14 is in turn connected to the pressurized side of a pump 16, such as an air-actuated slurry pump, which can be conveniently mounted on a truck 18. The low pressure side of pump 16 is fed by a low pressure proppant/slurry line 20, which in turn comes from a sand/fluid blending unit 22. Sand blending unit 22 blends sand from a sand pit 24 or other sand holding means, as taken up through sand conveying conduit 26, with a transport fluid from a fluid truck 28 which is piped through line 30. The transport fluid, which can be water, may also be stored in a stationary fluid tank. Sand blending unit 22 may be conveniently mounted on a trailer 32.

Interposed on pressurized proppant line 14 in a position well away from pump truck 18 is the radioactive proppant dispensing unit 34 of the invention, which may be attached to the pressurized line 14 by a "T" connection 36. In this embodiment, dispensing unit 34 is actuated and controlled by an electrical system, which communicates through a cable 38 to an electrical truck 40.

Figure 2:
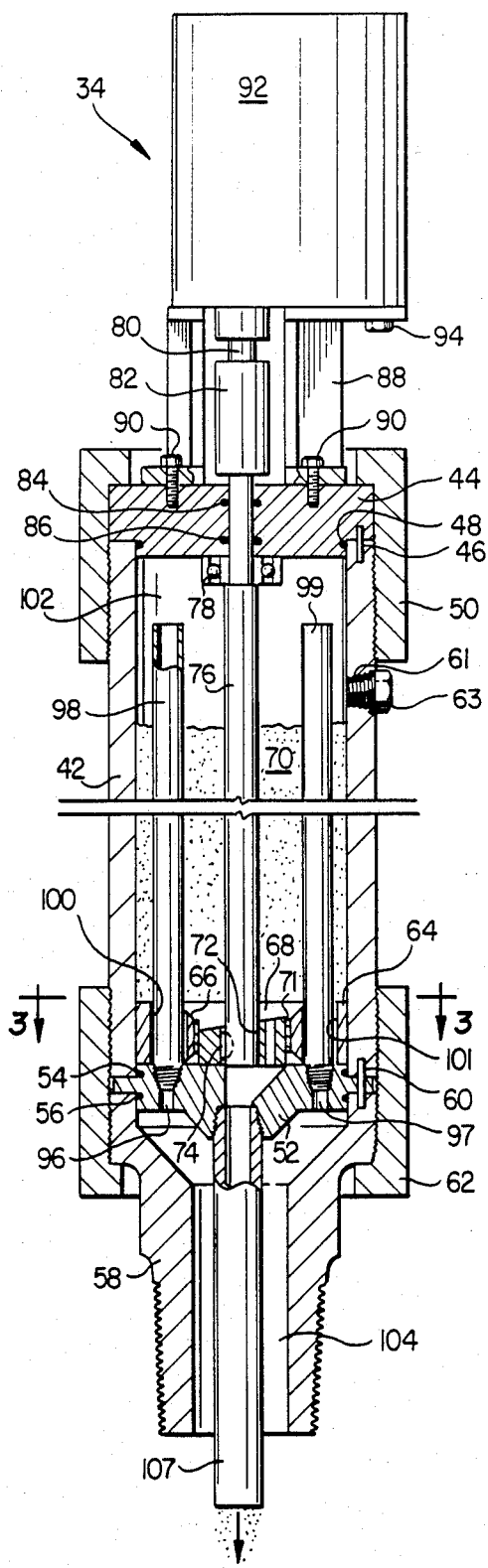
FIG. 2 is a part-elevational, part-sectional view of the proppant dispenser of the invention.
Figure 3:
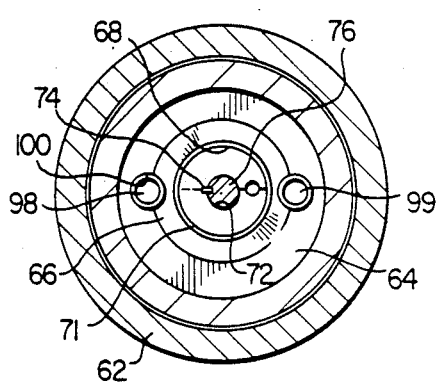
FIG. 3 is a section taken substantially along line 3—3 of FIG. 2.

Referring simultaneously to FIGS. 2 and 3, dispensing unit 34 is shown in more detail. A central housing 42 is closed off at its upper end by a cap 44 which is positioned with the aid of a bearing needle and associated sockets 46. An O-ring and backup ring combination 48 sealably engages cap 44 and central housing 42. Cap 44 is tightened into place by an upper hammer nut 50. The lower end of central housing 42 is abutted by an alignment plate 52, which is sealed by means of O-ring and backup ring combinations 54 and 56. Central housing 42 and alignment plate 52 are fitted onto a fitting connector 58 with the help of a bearing needle and associated sockets 60. Central housing 42, alignment plate 52 and fitting connector 58 are secured together by a lower hammer nut 62.

At a convenient location below upper hammer nut 50, a threaded hole 61 is formed in central housing 42. The threaded hole 61 is removably covered by a threaded cap 63. Threaded hole 61 is provided to allow for filling dispensing unit 34 with proppant without having to remove hammer nut 50, cap 44 and its associated parts.

Positioned on top of alignment plate 52 is a stationary auger ring 64. Auger ring 64 has a central conical upper annulus 66 which extends from a central bore 68 upwardly and outwardly to form a conical feeding section for radioactive sand or other additive 70.

Interference fitted into central bore 68 is a washer 71. Washer 71 is provided to prevent wear of the surface of auger ring 64 in central bore 68 by the turning of auger 72. Washer 71 may be any appropriate material, for example, brass. Rotating in central bore 68 is auger or screw 72 which is connected as by means of a woodruff key 74 to a drive shaft 76. Drive shaft 76 is supported at its upper end by a bearing 78 and is connected to a gear motor shaft 80 by a shaft connector 82. O-rings 84 and 86 sealably engage drive shaft 76 and upper cap 44. A motor mount 88 is mounted on cap 44 by means such as cap screws 90, and the motor mount supports a gear motor 92 or other suitable drive means as by screws 94.

Threaded into bores 96 and 97 of alignment plate 52 are first and second equalizer tubes 98 and 99, which extend through passages 100 and 101 in stationary auger ring 64 into the upper portion of an upper chamber 102. Upper Chamber 102 is defined by central housing 42, upper cap 44 and stationary auger ring 64. Thus, passageways are defined from upper chamber 102 to a lower chamber 104, which is formed by fitting connector 58 and alignment plate 52.

In the prior U.S. Pat. No. 4,681,245 to Harvey, only one equalizer tube was provided. It has been found that the use of only one equalizer tube allows air to be trapped above the proppant by the inflow of fluid. The inflow also causes agitation of the proppant resulting in an undesirable foam as well as premature release of proppant. Even though the reasons are not fully understood, the use of two equalizer tubes has been proven through testing to prevent this agitation and premature release.

A delivery pipe 107 is connected from alignment plate 52 in order to deliver the metered sand. As can be seen, first and second equalizer tubes 98 and 99 are disposed entirely within housing 42, cap 44 and alignment plate 52, and their sole means of support is by means of alignment plate 52 and stationary auger ring 64. First and second equalizer tubes 98 and 99 therefore do not require airtight weld mounts to the exterior of fitting connector 58 and housing 42, and can be entirely straight, simple-to-fabricate sections as shown. In this preferred construction, there is no possibility of leakage due to a failure of a sealing attachment of an exterior equalizer tube to one of the chambers with which it communicates.

In an alternate embodiment (not shown) shaft 76 is slotted to catch quantities of sand 70 and is geared to move up and down through an (e.g.) 3½ inch stroke rather than to rotate. Auger ring 64 and auger 72 are replaced with a flat annular ring provided with a pair of O-rings that sealably engage shaft 76 and delivery pipe 107 is removed. Shaft 76 moves up and down to catch sand 70 in upper chamber 102 and inject it into lower chamber 104.

In operation, threaded cap 63 is removed, and upper chamber 102 is filled most of the way with radioactive sand or the like, which is doped by Iridium 192, Iodine 131 or other suitable tracer material. On a fractionation job requiring two million pounds of proppant, approximately ten pounds of sand containing two hundred millicuries of radiation may be required. The size of upper chamber 102 and its defining components can be varied according to the size of the fractionation job.

After the radioactive sand 70 is loaded into upper chamber 102, threaded cap 63 is replaced. Dispensing unit 34 is then screwed into place on "T" connector 36 in preparation for the pumping of the proppant (FIG. 1).

To activate the unit 34, fluid from the well 12 is admitted into the unit 34 by opening a valve, not shown, in the line 14. Fluid flows into upper chamber 102 through equalizer tubes 98 and 99. Due to the addition of second tube 99, it is possible to prevent the trapping of air in the upper chamber 102. Second tube 99, in combination with first tube 98, provides enough of a complete loop for air to escape from upper chamber 102. By preventing the trapping of air in upper chamber 102, there is no turbulence of the sand 70 and thus sand 70 is not released prematurely.

As proppant is pumped under pressure along line 14, radioactive sand 70 is metered from upper chamber 102 into delivery pipe 107 and drops into pressurized proppant line 14 by gravity. In the illustrated embodiment, one complete turn of auger 72 dispenses one-half ounce of radioactive sand into delivery pipe 107. Consequently, the sand may be very accurately metered by control of the rotation of motor 92.

As radioactive sand is being dispensed down delivery pipe 106 into pressurized proppant line 14, equalizer tubes 98 and 99 maintain equal pressure between lower chamber 104 and upper chamber 102. The fluid passing up equalizer tubes 98 and 99 may be either air or fluidized proppant. This however is not deleterious, as proppant mixed from normal sand and liquid is less dense than radioactive sand 70 and thus does not mix. Particles of sand 70 are associated with heavy radioisotopic material and are thus heavier than the untreated sand.

Figure 4:
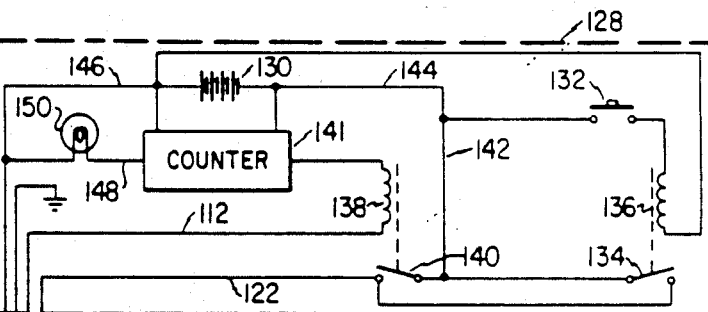
FIG. 4 is an electrical diagram of the electrical power and control circuitry employed in one embodiment of the invention.
Figure 4:
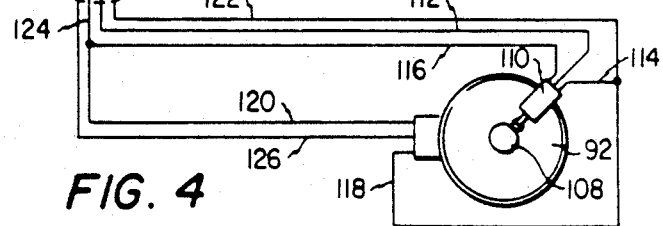

Referring to FIG. 4, the revolutions of auger 72 may be controlled remotely by an electrical circuit 106. Motor 92 has mounted on it a central shaft cam 108, which engages a limit switch 110. Limit switch 110 is spring loaded to its open position, but is normally forced closed by cam 108 except when it engages a flat spot 135 of cam 108. Switch 110 is fed by a positive line 112, a negative line 114 and a ground line 116. Negative line 114 and ground line 116 are connected to corresponding negative and ground lines 118 and 120, respectively, feeding motor 92 to form dispensing unit negative an ground lines 122 and 124, respectively. Lines 122 and 124, together with positive limit switch line 112 and a positive motor line 126 together communicate with an operator control station 128 at truck 40 by means of cable 38. Positive motor line 126 is connected directly to a voltage source 130, which may be a 24 volt DC battery source.

Operator control station 128 in this embodiment is designed to dispense proppant additive in increments each defined by one revolution of motor 92. To begin dispensing proppant additive 70, the operator closes a momentary switch 132, which operates to close a switch 134 via a relay 136. This completes the circuit to motor 92, which begins rotating. After limit switch 110 clears the flat spot 135 on cam 108, limit switch 110 closes, causing current to flow through a relay 138, which in turn closes a switch 140. If the operator releases momentary switch 132, which may be in the form of a push button, power will continue to be supplied to motor 92 until limit switch 110 once again encounters flat spot 135, whereupon the power supply to motor 92 will be broken. Thus, the operator is assured of delivering a measured increment of proppant additive to pressurized proppant line 14 each time he closes momentary switch 132.

A counter 142 senses the number of times motor 92 has revolved by counting each time the circuit formed by lines 114, 122, 144, 146, 148 and 112 is energized. An indicator light 150 may be provided to inform the operator when the automatic portion of the control circuit is energized. Thus, electrical circuit 107 allows an operator to dispense measured amounts of proppant additive 70 into pressurized proppant line 14 from a remote station.

While the invention has been described in terms of injecting a radioactive sand additive into a pressurized proppant line during an oil well logging procedure, other uses for the apparatus herein described may be easily determined. The apparatus is useful for injecting any dry or semi-fluid material into a pressurized line. Its use of the force of gravity to dispense the additive and its interiorly disposed pressure equalization tube represent advances in dispenser design in this type of application.

Although an illustrated embodiment of the invention has been described in detail, it should be understood that various changes, substitutions and alterations can be made therein without departing from the spirit and scope of the invention, as defined by the appended claims.

What is claimed is:

1. Sealed apparatus for accurately dispensing an additive into a pressurized stream of well proppant the apparatus comprising:
   a sealed housing interconnected to the stream for containing the additive, and including a chamber above said additive such that said additive is positioned between said chamber and the pressurized stream;
   a stationary auger ring sealed to the interior of said housing;
   movable additive dispensing means disposed internal to said apparatus between said chamber and the pressurized stream, and movable within said auger ring from a first position in which the flow of additive is shut off and the chamber is sealed from the pressurized stream, to a second position in which said chamber is in communication with said pressurized stream so that the additive in said housing can be dispensed into the stream, said dispensing means forming the bottom of said container upon which the additive rests;
   drive means for moving said dispensing mans; and
   a plurality of pressure equalizing conduits disposed within said sealed housing extending from said additive chamber through said auger ring and in communication with the stream of well proppant, said pressure equalizing conduits equalizing the fluid pressure existing in the pressurized stream with the fluid pressure existing in said chamber, such that undesirable turbulence and agitation of said additive within said chamber is reduced.

2. The apparatus of claim 1, wherein said sealed housing further includes a hole with a removable cap for filling said housing with the additive.

3. The apparatus of claim 1, wherein said plurality of pressure equalizing conduits comprise two conduits extending from said chamber through said auger ring and in communication with the stream of well proppant.

4. The apparatus of claim 1, wherein said auger ring further includes a replaceable wear washer positioned between said auger ring and said dispensing means.

5. The apparatus of claim 4, wherein said washer comprises brass.

6. In a method for delivering an additive to a pressurized fluidized proppant line during delivery of said pressurized, fluidized proppant to a well, the steps of:
   sealing a first chamber from the atmosphere;
   filling said first chamber with an additive through a removably coverable hole in said first chamber;
   coupling a second chamber with a pressurized proppant transporting line;
   metering additive contained within said first chamber to said second chamber;
   equalizing fluid pressure in said second chamber with fluid pressure inside said first chamber using a plurality of conduits disposed within and extending form said first chamber to said second chamber, such that undesirable turbulence of said additive is reduced; and dropping said additive from said second chamber to the pressurized proppant transporting line for transportation into the well.

7. The method of claim 6, wherein the step of equalizing the pressure further includes preventing the trapping of air within said first chamber by using two conduits disposed within the housing and extending from said first chamber to said second chamber.

* * * * *